United States Patent [19]
Asami et al.

[11] Patent Number: 5,604,636
[45] Date of Patent: Feb. 18, 1997

[54] METHOD OF RECEIVING LIGHT AND LIGHT RECEIVING MODULE OF LESS POLARIZED LIGHT DEPENDENCY

[75] Inventors: Keisuke Asami; Naoto Satoh; Akishige Itoh, all of Tokyo, Japan

[73] Assignee: Ando Electric Co., Ltd., Tokyo, Japan

[21] Appl. No.: 428,657

[22] Filed: Apr. 25, 1995

[30] Foreign Application Priority Data

May 20, 1994 [JP] Japan ................................. 6-131142

[51] Int. Cl.$^6$ ......................................... G02B 27/14
[52] U.S. Cl. ........................ 359/637; 359/494; 359/499; 359/896; 250/225
[58] Field of Search .................. 359/487, 494, 359/896, 637, 499, 837; 372/36; 257/98, 99; 385/15, 31, 38, 48; 250/225

[56] References Cited

U.S. PATENT DOCUMENTS

| | | | |
|---|---|---|---|
| 5,414,565 | 5/1995 | Sullivan et al. | 359/896 |
| 5,490,013 | 2/1996 | Shimizu et al. | 359/637 |
| 5,491,582 | 2/1996 | Fujita | 359/341 |

FOREIGN PATENT DOCUMENTS

| | | |
|---|---|---|
| 54-181 | 1/1979 | Japan . |
| 0212710 | 10/1985 | Japan ............................. 385/48 |
| 6029190 | 2/1994 | Japan ............................. 359/896 |

*Primary Examiner*—Timothy P. Callahan
*Assistant Examiner*—Dinh T. Le
*Attorney, Agent, or Firm*—Flynn, Thiel, Boutell & Tanis, P.C.

[57] ABSTRACT

In a light receiving module of a first aspect of the invention, a transparent plate is provided therein in such a way as to be tilted so that polarized light dependency generated thereby is equal to that generated by tilting a light receiving element and moreover in a positional relationship of being perpendicular to the latter in tilting direction. As a result, even if incident light is varied in polarized state, polarized light dependencies generated by the transparent plate and the light receiving element cancel each other to restrain the polarized light dependency of the incident light as a whole. In a light receiving module according of a second aspect of the invention, the light-emitting end surface of an optical fiber is formed in the same positional relationship relative to the light receiving surface of the light receiving element as that of the transparent plate of the first aspect of the invention. As a result, it is possible to provide a light receiving module which is reduced in polarized light dependency generated by tilting the light receiving element to be less influenced by the variation of polarized state of incident light.

5 Claims, 5 Drawing Sheets

ANGLE OF PLANS OF POLARIZATION
(DEGREE)

METHOD OF RECEIVING LIGHT AND LIGHT RECEIVING MODULE OF LESS POLARIZED LIGHT DEPENDENCY

BACKGROUND OF THE INVENTION

1. Field of the Invention

The present invention relates to a method of receiving light and a light receiving module of less polarized light dependency. The light receiving module is used for evaluating the polarization characteristic of various optical components.

2. Description of the Related Art

Figure 8:
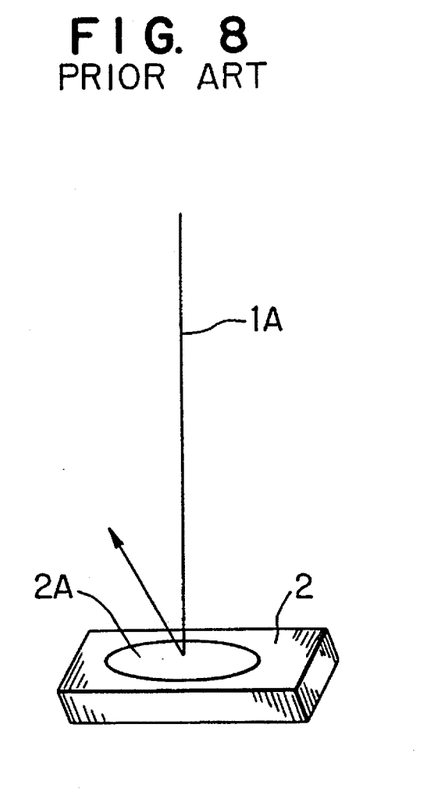
FIG. 8 is a view showing an arrangement of a light receiving module of a prior art.

The arrangement of a conventional light receiving module will be described hereinafter with reference to FIG. 8. In FIG. 8, denoted at 2 is a light receiving element and 1A is incident light to the light receiving surface of the light receiving element 2. The light receiving element 2 converts the incident light 1A into an electric signal to measure the output of the incident light 1A.

In FIG. 8, the light receiving surface 2A of the light receiving element 2 receives the incident light 1A with the normal of the light receiving surface 2A tilted by several degrees relative to the optical axis of the incident light 1A. When light reflected by the light receiving surface 2A returns to the light source, for example in case of laser, it deteriorates the performance of the light source to obstruct accurate measurement of light. Such a method of preventing a light receiving element from being deteriorated in performance by tilting the same is, for example, disclosed in Japanese Patent Publication No. 54-181.

In FIG. 8, even if the incident light 1A is unchanged in light output, the polarized state of the incident light 1A or the variation of wavelength thereof cannot be neglected for high-accuracy measurement. In FIG. 8, tilting the normal Of the light receiving element 2 relative to the optical axis of the incident light 1A causes difference in index of refraction depending on the polarized state of the incident light 1A and consequently in amount of passing light at the light receiving surface 2A of the light receiving element 2. The amount of passing light referred to here is the amount of light obtained by subtracting that of reflected light from that of the whole incident light 1A.

Figure 9:
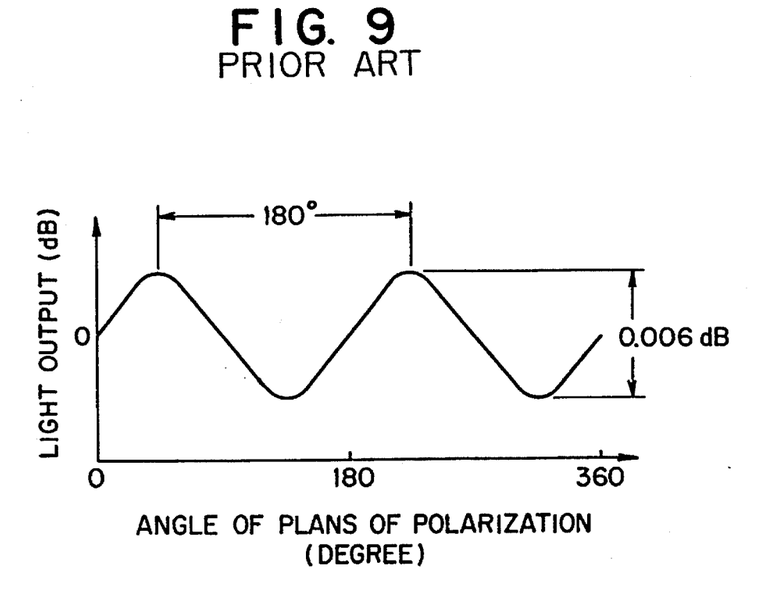
FIG. 9 is a graph showing polarized light dependency generated by a tilted light receiving element in FIG. 8.

FIG. 9 shows a relationship between the light output received by the light receiving element 2 and the angle of rotation of the light receiving surface 2A about the optical axis of the incident light 1A in case the normal of the light receiving surface 2A of the light receiving element 2 is tilted relative to the optical axis of the incident light 1A. The incident light 1A referred to here is polarized linearly. The axis of ordinate represents light output received by the light receiving element 2 and that of abscissa represents the angle of rotation of plane of polarization. When the normal of the light receiving surface 2A is tilted by 4° relative to the optical axis in FIG. 9, polarized light dependency, described later, is about 0.006 dB.

As illustrated in FIG. 9, there is a problem in that the light output finally detected by the light receiving element 2 varies with the variation of polarized state even if the amount of the incident light 1A is constant in light output. This variation of light received by the light receiving element 2 will be called hereinafter as polarized light dependency.

SUMMARY OF THE INVENTION

It is an object of the invention to provide a method of receiving light and a light receiving module which are less influenced by the variation of polarized state of incident light by reducing polarized light dependency which is generated when the normal of a light receiving element is tilted at an arbitrary angle relative to the optical axis of incident light.

The method of receiving light according to a first aspect of the invention, in case of measuring the light output of incident light 1A by arranging the light receiving surface 2A of a light receiving element 2 with its normal tilted relative to the optical axis of the incident light 1A, comprises arranging a transparent plate 3 adjacent to the light receiving surface 2A of the light receiving element 2 with its normal tilted relative to the optical axis of the incident light 1A, tilting the transparent plate 3 at an angle at which polarized light dependency generated thereby is equal to that generated by tilting the light receiving surface 2A of the light receiving element 2 and holding the transparent plate 3 and the light receiving surface 2A in such a positional relationship as to be perpendicular to each other in tilting direction.

The method of receiving light according to a second aspect of the invention, in case of measuring the light output of light 4A emitted from an optical fiber 4 by arranging the optical fiber 4 and the light receiving surface 2A of the light receiving element 2 adjacent to each other and forming the light receiving surface 2A with its normal tilted relative to the optical axis of the light 4A, comprises forming the light-emitting end surface 4B of the optical fiber 4 with its normal tilted relative to the optical axis of the light 4A, tilting the light-emitting end surface 4B of the optical fiber 4 at an angle at which polarized light dependency generated thereby is equal to that generated by tilting the light receiving surface 2A of the light receiving element 2 and holding the light-emitting end surface 4B of the optical fiber 4 and the light receiving surface 2A of the light receiving element 2 in such a positional relationship as to be perpendicular to each other in tilting direction.

According to the first aspect of the invention, since the transparent plate 3 is tilted at an angle at which polarized light dependency generated thereby is equal to that generated by the light receiving element 2 and moreover the former is fixed in a positional relationship with the latter wherein they are perpendicular to each other in tilting direction, even if the incident light 1A is varied in polarized state, polarized light dependencies generated at both components cancel each other to restrain the polarized light dependency of the light receiving module as a whole.

According to the second aspect of the invention, since the light-emitting end surface 4B of the optical fiber 4 is arranged at an angle at which polarized light dependency generated thereby is equal to that generated by the light receiving element 2 and moreover the former is mounted on the light receiving module 5 in a positional relationship with the latter wherein they are perpendicular to each other in tilting direction, the polarized light dependency generated by tilting the light receiving element 2 is canceled by that generated at the light-emitting end surface 4B of the optical fiber 4.

DESCRIPTION OF THE PREFERRED EMBODIMENT

Figure 1:
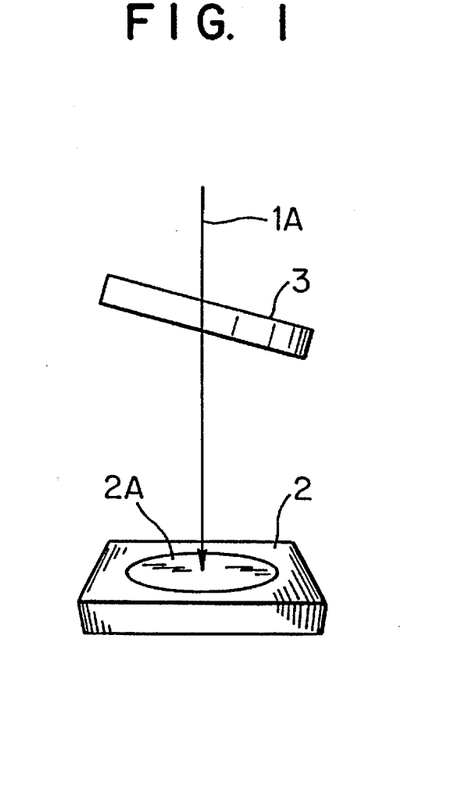
FIG. 1 is a view showing an arrangement of a light receiving module for explaining the method of receiving light according to a first embodiment of the invention.

A method of receiving light according to a first aspect of the invention will be described hereinafter with reference to FIG. 1. In FIG. 1, denoted at 3 is a transparent plate and other components are the same as those in FIG. 8. Unless otherwise specified, it is supposed that incident light is a parallel ray and a parallel-surfaced glass plate is used for the transparent plate 3.

In FIG. 1, incident light 1A is incident to the light receiving element 2 after passing through a glass plate 3. The light receiving element 2 is disposed with its normal tilted by several degrees relative to the optical axis of the incident light 1A to prevent the incident light 1A from being reflected by the light receiving surface 2A and returning toward a light source. However, the tilting angle, i.e., the angle of incidence of the incident light 1A and difference in index of refraction between air and the light receiving element 2 generate polarized light dependency.

The polarized light dependency generated in the interface between materials which are different in index of refraction to each other can be obtained from the following formula:

polarized light dependency [db]=10·log (T)−10·log (T')

$$T = \frac{4 \cdot n_1 \cdot \cos \phi 1 \cdot \sqrt{(n_2^2 - n_1^2 \cdot \sin^2 \phi 1)}}{(n_1 \cdot \cos \phi 1 \sqrt{(n_2^2 - n_1^2 \cdot \sin^2 \phi 1)})^2}$$

$$T = \frac{4 \cdot n_1 \cdot \cos \phi 1 \cdot \sqrt{(n_2^2 - n_1^2 \cdot \sin^2 \phi 1)}}{(n_2 \cdot \cos \phi 1 + (n_1/n_2) \sqrt{(n_2^2 - n_1^2 \cdot \sin^2 \phi 1)})^2}$$

T: transmission factor in case the electric field of incident light is perpendicular to the plane of incidence.

T': transmission factor in case the electric field of incident light is parallel to the plane of incidence $n_1$: index of refraction at the side of incidence $n_2$: index of refraction at the side of emission $\phi 1$: angle of incidence to interface.

Figure 2:
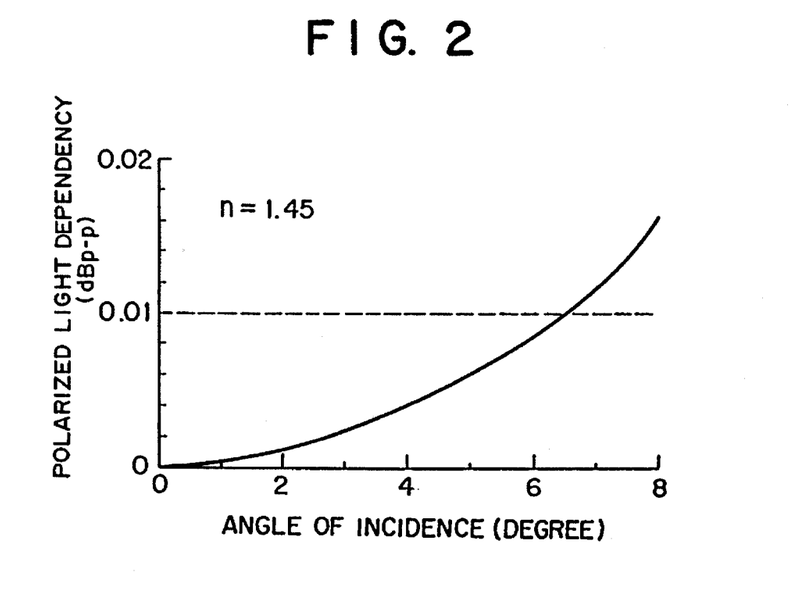
FIG. 2 is a graph showing a relationship between the angle of incidence of incident light and polarized light dependency in FIG. 1.

FIG. 2 shows a relationship between the angle of incidence of incident light and polarized light dependency obtained from the formula in case of a glass plate (n=1.45).

For example, if two interfaces are perpendicular to each other in tilting direction, the electric field of incident linearly polarized light is perpendicular to one of the interfaces is necessarily parallel to the other. Accordingly, the polarized light dependencies generated in interfaces are added to each other in case the directions of angles of incident are the same while cancel each other in case the directions thereof are perpendicular to each other.

In FIG. 1, the glass plate 3 is tilted at an angle obtained from the graph in FIG. 2 so that it generates polarized light dependency equal to that generated by the light receiving element 2 in a direction perpendicular to that in which the light receiving element 2 is tilted. For example, in case the polarized light dependency of the light receiving element 2 is 0.006 $dB_{P-P}$, the graph in FIG. 2 teaches that the glass plate 2 should be tilted 5 degrees.

Figure 3A:
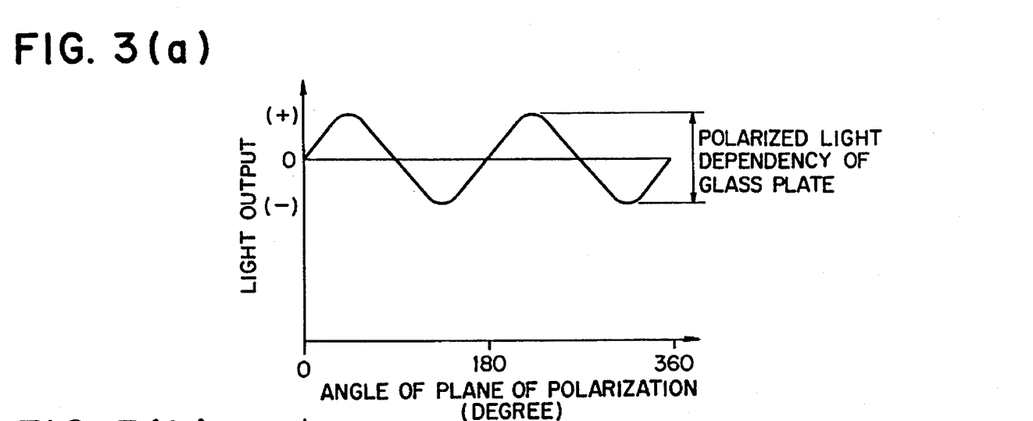
FIG. 3(a) to 3(c) show graphs of relationship between angle of plane of polarization and polarized light dependency in cases of a light receiving element 2, a transparent plate 3 and the light receiving module as a whole in FIG. 1.
Figure 3B:
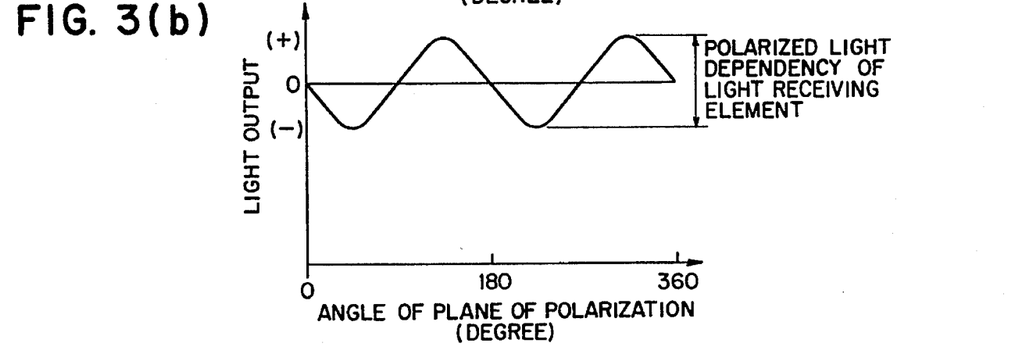
Figure 3C:
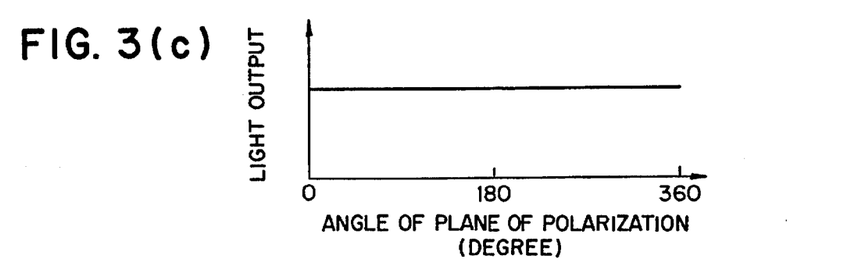

FIG. 3 shows graphs of relationship between angle of plane of polarization and polarized light dependency in cases of a light receiving element 2 and a transparent plate 3. FIGS. 3 (a) and 3 (b) show the polarized light dependency of the transparent plate 3 and that of the light receiving element 2 respectively. As shown in FIGS. 3 (a) and 3 (b), even if the polarized state of the incident light 1A is varied, the light receiving element 2 and the transparent plate 3 generate polarized light dependencies having opposite phases which cancel each other so as to be in a state as illustrated in FIG. 3 (c).

A light receiving module 5 according to a first embodiment of the first aspect of the invention will be described hereinafter with reference to a view showing a main structure thereof in FIG. 4. When the light receiving element 2 receives the incident light 1A, the light receiving element 2 is usually tilted more than 4° relative to the optical axis of the incident light 1A. Whereas, the angle of incident of the incident light 1A and difference in index of refraction between air and the light receiving element 2 in the interface therebetween generate polarized light dependency.

Figure 4:
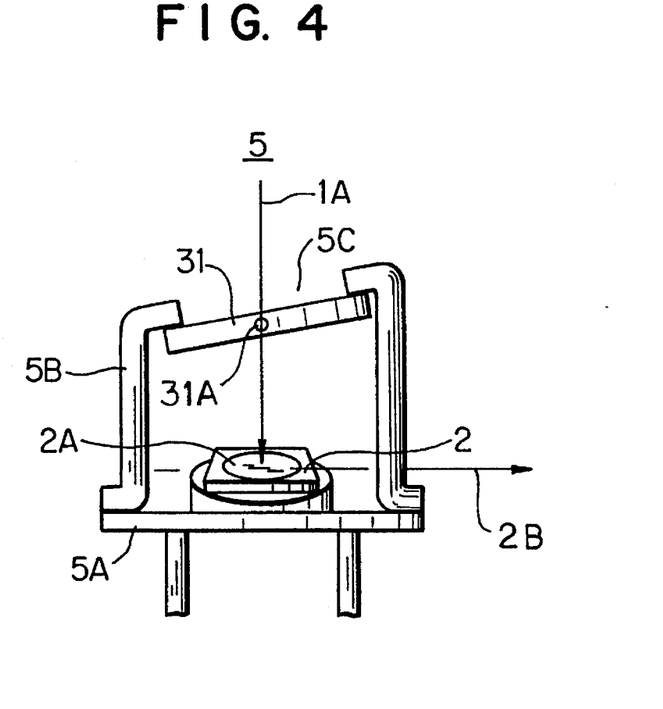
FIG. 4 is a view showing an arrangement of a light receiving module 5 according to a first embodiment of the first aspect of the invention.

In FIG. 4, the light receiving surface 2A of the light receiving element 2 is fixed to the inner bottom portion of a stem 5A in a state of being tilted 4°. Polarized light dependency is about 0.006 $dB_{P-P}$ in case the light receiving surface 2A is tilted 4° and germanium is employed for the light receiving element.

In FIG. 4, a glass plate 31 is mounted on a window 5C of a cap 5B to be tilted relative to a second normal plane to the optical axis of the incident light 1A so that polarized light dependency generated by tilting the light receiving surface 2A is equal to that generated by tilting the glass plate 31. Moreover, the cap 5B is adjusted in position so that the tilting direction of the glass plate 31 mounted thereon is perpendicular to that of the light receiving element 2, and thereafter the cap 5B is fixed to the stem 5A. Supposing that the index of refraction of the glass plate 31, i.e., n=1.45, the characteristic curve in FIG. 2 teaches that the glass plate 31 should be tilted 5° relative to the horizontal plane as it is fixed to the cap 5B.

In the light receiving module 5 illustrated in FIG. 4, the glass plate 31 is tilted at an angle at which polarized light dependency generated thereby is equal to that generated by the light receiving element 2 and moreover the former is mounted on the light receiving module 5 in a positional relationship with the latter wherein they are perpendicular to each other relative to their axes about which they are are rotated. In other words, the axis around which the glass plate 31 is rotated, represented by arrow head, (point) 31A is perpendicular to the axis around which the light receiving surface is rotated, represented by arrow 2B. As a result, even if the polarized state of light incident to the light receiving module 5 is varied, the polarized light dependencies generated at both components cancel each other to restrain the polarized light dependency of the light receiving module 5 as a whole.

A light receiving module 6 according to a second embodiment of the first aspect of the invention will be described hereinafter with reference to a view showing a main structure thereof in FIG. 5. In the light receiving module 5 according to the first embodiment, a parallel-surfaced glass plate is employed for the transparent plate to cancel the polarized light dependency of the light receiving element 2. The parallel-surfaced glass plate, however, generates interference in case incident light is high in coherency. The interference is generated by multiple refraction between the two surfaces when a parallel ray passes through the parallel-surfaced plate to cause a periodical fluctuation of light output with the variation of wavelength or thickness of the plate. That is, under the condition in which interference is generated, detected light output fluctuates with the variation of wavelength even if the polarized light dependency is canceled.

A method of employing a wedge plate for preventing such interference due to the parallel-surfaced plate can be conceived. The wedge plate is a glass plate having a wedge shape in which one surface is inclined relative to the other for coercively deflecting the multiple reflecting light therein from the optical axis and continuously changing the thickness of the plate to prevent resonance at a particular wavelength and average the fluctuation of passing light for prevention of interference.

Figure 5:
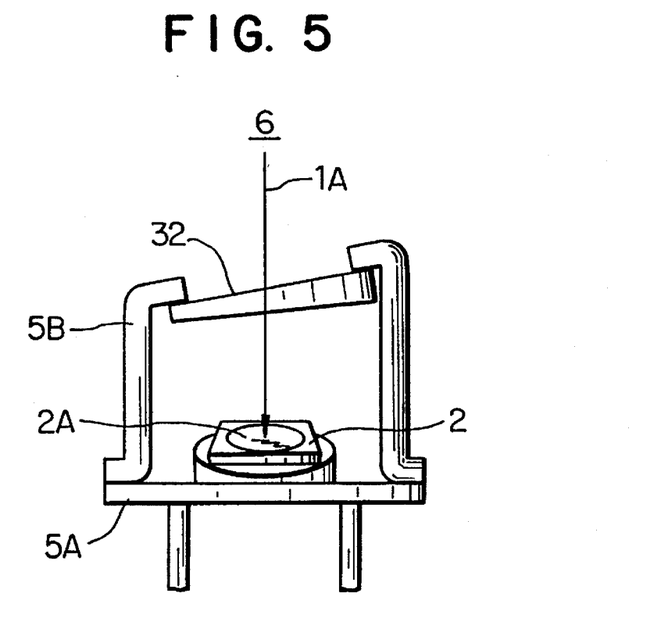
FIG. 5 is a view showing an arrangement of a light receiving module 6 according to a second embodiment of the first aspect of the invention.

In FIG. 5, the afore-mentioned wedge plate is employed for the transparent plate 3. That is, the glass plate 31 in FIG. 4 is substituted with a wedge plate 32 in FIG. 5. It is possible to obtain a light receiving module which does not depend on the wavelength of the incident light 1A or the variation of the polarized state even if the incident light 1A is high in coherency in FIG. 5, since the polarized light dependency is canceled similarly to the light receiving module 5 in FIG. 4.

Figure 6:
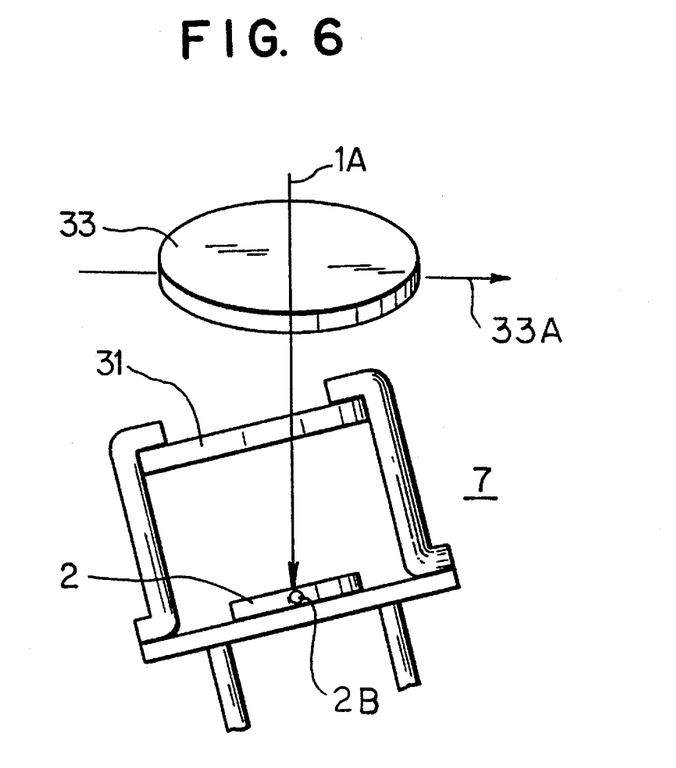
FIG. 6 is a view showing an arrangement of a light receiving module according to a third embodiment of the first aspect of the invention.

A light receiving module 6 according to a third embodiment of the first aspect of the invention will be described hereinafter with reference to a view showing a main structure thereof in FIG. 6. FIG. 6 shows an embodiment employing a common light receiving element accommodated in a can package. In FIG. 6, the light receiving element 2 is fixed to a can package 7 in such a manner that the light receiving surface 2A of the light receiving element 2 is parallel to the glass plate 31.

In FIG. 6, When the can package 7 is tilted relative to a first normal plane to the optical axis of the incident light 1A to prevent light from returning toward the light source being reflected by the light receiving element 2 and the glass plate 31, the light receiving element 2 and the glass plate 31 are tilted in the same direction. As a result, polarized light dependency generated by the light receiving element 2 and that generated by the glass plate 31 are in phase so that they are added to each other.

In FIG. 6, a parallel-surfaced glass plate 33 is provided before the can package 7 for passing the incident light 1A therethrough. In FIG. 6, the parallel-surfaced glass plate 33 is arranged in a positional relationship with the light receiving element 2 and the glass plate 31, wherein it is tilted at an angle relative to a second normal plane to the optical axis of the incident light to generate polarized light dependency which is equal to the sum of those generated by the latter, and moreover they are perpendicular to relative to the axes 33A and 2B about which the glass plate and light receiving element are rotated.

In FIG. 6, polarized light dependency is about 0.01 $dB_{P-P}$ in case the light receiving element 2 and the glass plate 31 are tilted 4° and the light receiving element 2 is made of germanium. Supposing that the index of refraction of the parallel-surfaced glass plate 33 is 1.45, the graph in FIG. 2 teaches that the parallel-surfaced glass plate 33 should be tilted about 6.5°.

Figure 7:
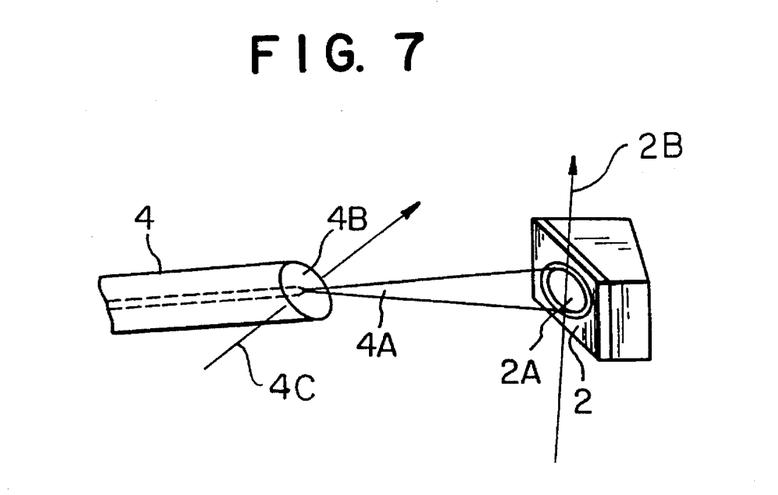
FIG. 7 is a view showing an arrangement of a light receiving module according to an embodiment of a second aspect of the invention.

A method of receiving light according to an embodiment of the second aspect of the invention will be described hereinafter with reference to FIG. 7. FIG. 7 shows a pigtail-type light receiving module for coupling the light 4A emitted from the optical fiber 4 to the light receiving element 2. In FIG. 7, the light-emitting side end surface of the transparent plate 3 according to the first aspect of the invention is substituted with the light-emitting end surface 4B of the optical fiber 4.

In FIG. 7, the light-emitting end surface 4B of the optical fiber 4 is formed at an angle at which polarized light dependency generated by tilting the light-emitting end surface 4B is equal to that generated by tilting the light receiving surface 2A. Moreover, the light-emitting end surface 4B arranged in a positional relationship with the light receiving surface 2A wherein the axis about which the light emitting end surface 4B is rotated, represented by arrow 4C, is perpendicular to the axis about which the light receiving surface is rotated, represented by arrow 2B. In FIG. 7, polarized light dependency generated by tilting the light receiving surface 2A is canceled by that generated at the light-emitting end surface 4B of the optical fiber 4.

According to the first aspect of the invention, although a parallel ray is exemplified as incident light, diffusing or converging light of comparatively small NA on the order of 0.1 to 0.2 can obtain a similar effect too as described in the second aspect of the invention.

According to the first aspect of the invention, the transparent plate is tilted in such a manner as to generate the same polarized light dependency as that generated by tilting the light receiving element and be perpendicular to the latter in tilting direction. As a result, even if the polarized state of incident light is varied, polarized light dependencies cancel each other to restrain the polarized light dependency of the light receiving module as a whole.

According to the second aspect of the invention, the light-emitting end surface of an optical fiber is formed at an angle at which polarized light dependency generated at the light-emitting end surface is equal to that generated by tilting the light receiving surface and moreover the tilted directions are perpendicular to each other, so that polarized light dependency generated at the light-emitting end surface 4B cancels that generated by tilting the light receiving element.

According to the first and second inventions, even if the polarized state of incident light is varied, it is possible to provide a light receiving module which is less influenced thereby since polarized light dependencies generated therein cancel each other to be restrained as a whole.

What is claimed is:

1. A method of receiving incident light on a light receiving surface of a light receiving element wherein the light receiving surface is in a plane that is tilted around a first normal plane relative to an optical axis of the incident light, so as to minimize the effect variations in the polarized state of the incident light have on light output measurements made by the light receiving element, said method characterized in comprising:

determining the polarized light dependency of the tilted light receiving surface of the light receiving element;

arranging a transparent plate adjacent to the light receiving surface of the light receiving element normal tilted relative to said optical axis of said incident:

tilting said transparent plate at an angle relative to a second normal plane to the optical axis so that said transparent plate has a polarized light dependency that is equal to the polarized light dependency of the light receiving element of the light receiving element; and holding said transparent plate and the light receiving surface of the light receiving element in such a positional relationship so that the axis around which the light receiving surface is rotated and the axis around which said transparent plate is rotated are perpendicular to each other.

2. A method of receiving light for measuring a light output of light emitted from an optical fiber by arranging the optical fiber and a light receiving surface of a light receiving element adjacent to each other wherein the light receiving surface is in a plane tilted around a first normal plane to an optical axis of the light emitted by the optical fiber, so as to minimize the effect variations in the polarized state of the incident light have on light output and measurements made by the light receiving element, said method characterized in comprising:

determining the polarized light dependency of the tilted light receiving surface of the light receiving element;

forming a light-emitting end surface of the optical fiber;

tilting said light-emitting end surface of the optical fiber around a second normal plane to the optical axis so that said light-emitting end surface has a polarized light dependency generated that is equal to the polarized light dependency of the light receiving surface of the light receiving element; and holding said light-emitting end surface of the optical fiber and the light receiving surface of the light receiving element so that the axis about which the light receiving surface is rotated and the axis about which said light emitting end surface of the optical fiber is rotated are perpendicular to each other.

3. A light receiving module for receiving incident light that is focused along an optical axis comprising:

a stem;

a light receiving element mounted on said stem, said light receiving element having a light receiving surface for receiving the incident light, said light receiving surface being tilted relative to a first normal plane to the optical axis of the incident light so that relative to the incident light said light receiving surface has a polarized light dependency, wherein said light receiving surface is rotated about an axis;

a cap attached to said stem that is oriented towards a direction from which the incident light is applied, said cap having a window opening onto said light receiving surface of said light receiving element; and a parallel-surface transparent plate secured to said window of said cap wherein said transparent plate is tilted relative to a second normal plane to the optical axis of the incident light wherein said transparent plate is tilted so as to have a polarized light dependency equal to the polarized light dependency of said light receiving surface of said light receiving element, wherein said transparent plate is rotated about an axis that is perpendicular to said axis about which said light receiving surface of said light receiving element is rotated.

4. A light receiving module for receiving incident light that is focused along an optical axis comprising:

a stem;

a light receiving element mounted on said stem, said light receiving element having a light receiving surface for receiving the incident light, said light receiving surface being tilted relative to a first normal plane to the optical axis of the incident light so that relative to the incident light said light receiving surface has a polarized light dependency, wherein said light receiving surface is rotated about an axis;

a cap attached to said stem that is oriented towards a direction from which the incident light is applied, said cap having a window opening onto said light receiving surface of said light receiving element; and a wedge-shaped transparent plate secured to said window of said cap, wherein said transparent plate is tilted relative to a second normal plane relative to the optical axis of the incident light and said transparent plate is tilted so as to have a polarized light dependency equal to the polarized light dependency of said light receiving surface of said light receiving element, wherein said transparent plate is rotated about an axis that is perpendicular to said axis about which said light receiving surface of said light receiving element is rotated.

5. A light receiving assembly for receiving incident light that is focused along an optical axis comprising:

a stem;

a light receiving element mounted on said stem, said light receiving element having a light receiving surface for receiving the incident light, said light receiving surface being tilted relative to a first normal plane to the optical axis of the incident light so that relative to the incident light said light receiving surface has a polarized light dependency, wherein said light receiving surface is rotated about an axis;

a cap attached to said stem that is oriented towards a direction from which the incident light is applied, said cap having a window opening onto said light receiving surface of said light receiving element;

a first parallel-surface transparent plate secured to said window of said cap wherein said first parallel-surface transparent plate is in parallel alignment with said light receiving surface of said light receiving element; and a second parallel-surface transparent plate disposed above said first parallel-surface transparent plate, said second parallel-surface transparent plate being tilted relative to a second normal plane to the optical axis of the incident light wherein said second parallel-surface transparent plate is tilted so as to have a polarized light dependency equal to the polarized light dependency of said light receiving surface of said light receiving element and said second parallel-surface transparent plate is rotated about an axis that is perpendicular to said axis about which said light receiving surface of said light receiving element is rotated.

* * * * *

UNITED STATES PATENT AND TRADEMARK OFFICE
CERTIFICATE OF CORRECTION

PATENT NO. : 5 604 636  
DATED : February 18, 1997  
INVENTOR(S) : Keisuke ASAMI et al It is certified that error appears in the above-indentified patent and that said Letters Patent is hereby corrected as shown below:

Column 6, lines 66 and 67; delete "normal tilted relative to said optical axis of said incident".

Column 7, line 5; change "element" (first occurrence) to ---surface---.

Signed and Sealed this

Fifteenth Day of July, 1997

Attest:

Attesting Officer

BRUCE LEHMAN

Commissioner of Patents and Trademarks